United States Patent
Masuda et al.

(10) Patent No.: US 9,313,264 B2
(45) Date of Patent: Apr. 12, 2016

(54) SYSTEM CAPABLE OF PROVIDING PLURALITY OF DIGITAL CONTENTS AND METHOD USING SAME

(71) Applicant: DeNA Co., Ltd., Tokyo (JP)

(72) Inventors: Shinya Masuda, Tokyo (JP); Tomoyuki Shimada, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/222,511

(22) Filed: Mar. 21, 2014

(65) Prior Publication Data

US 2014/0297768 A1   Oct. 2, 2014

(30) Foreign Application Priority Data

Mar. 26, 2013   (JP) ................. 2013-063433

(51) Int. Cl.
H04L 29/08   (2006.01)
G06Q 30/00   (2012.01)

(52) U.S. Cl.
CPC .............. *H04L 67/10* (2013.01); *G06Q 30/00* (2013.01); *H04L 67/02* (2013.01); *H04L 67/22* (2013.01)

(58) Field of Classification Search
CPC ................... G06F 17/30038; H04L 67/10
USPC ........................................ 709/206
See application file for complete search history.

(56) References Cited

U.S. PATENT DOCUMENTS

| 5,732,216 | A  | * | 3/1998 | Logan et al. ............... 709/203 |
| 6,199,076 | B1 | * | 3/2001 | Logan et al. ............... 715/203 |
| 6,886,129 | B1 | * | 4/2005 | Raghavan et al. .......... 715/205 |
| 2004/0093396 | A1 | * | 5/2004 | Akune ....................... 709/219 |
| 2005/0216300 | A1 | * | 9/2005 | Appelman et al. ............ 705/1 |
| 2006/0075019 | A1 | * | 4/2006 | Donovan et al. ........... 709/203 |
| 2007/0220025 | A1 | * | 9/2007 | Hyman ............ G06F 17/30035 |
| 2009/0164641 | A1 | * | 6/2009 | Rogers et al. ............. 709/227 |

(Continued)

FOREIGN PATENT DOCUMENTS

| JP | 2013-025504 | 2/2013 |
| WO | 2013/136946 | 9/2013 |

OTHER PUBLICATIONS

Merriam-Webster, "consume", 2015.*

(Continued)

*Primary Examiner* — O. C. Vostal
(74) *Attorney, Agent, or Firm* — Pillsbury Winthrop Shaw Pittman LLP

(57) ABSTRACT

One object is to provide a system for facilitating posting for digital contents. The system according to an embodiment includes: a service control unit; an information storage unit a determination unit for determining whether a user is a fan of an artist a user information updating unit for storing a determination result by the determination unit in the information storage unit a use history information sending unit for sending reproduction history information; a posting information reception unit for receiving posting information including musical piece specifying information; a posting information registration unit for storing received posting information in the information storage unit; a posting information sending unit for sending the posting information to the terminal; a reproduction screen sending unit for sending, to the terminal, screen data of a musical piece reproduction screen; and a recommended user information sending unit for sending information on recommended users to the terminal.

8 Claims, 16 Drawing Sheets

(56) References Cited

U.S. PATENT DOCUMENTS

| | | | |
|---|---|---|---|
| 2012/0005617 A1* | 1/2012 | Lee et al. | 715/776 |
| 2012/0158775 A1* | 6/2012 | Choi et al. | 707/769 |
| 2012/0173625 A1* | 7/2012 | Berger | H04N 21/25891 709/204 |
| 2013/0066981 A1* | 3/2013 | Park et al. | 709/206 |
| 2013/0067510 A1* | 3/2013 | Ahanger et al. | 725/34 |
| 2013/0129075 A1* | 5/2013 | Whitaker | 379/265.09 |
| 2013/0204692 A1* | 8/2013 | Mallory | G06Q 50/01 705/14.36 |
| 2013/0238392 A1* | 9/2013 | Sloan | G06Q 30/0201 705/7.29 |
| 2013/0325550 A1* | 12/2013 | Varghese | G06Q 30/02 705/7.31 |
| 2014/0040030 A1* | 2/2014 | Winters | G06Q 30/0261 705/14.58 |
| 2014/0149553 A1* | 5/2014 | Bank et al. | 709/219 |
| 2014/0280556 A1* | 9/2014 | Kazi | H04L 51/32 709/204 |

OTHER PUBLICATIONS

Merriam-Webster, "usage", 2015.*
Certificate for Application of Provision of Exception to Lack of Novelty on Invention for Japanese Patent Application No. 2013-063433 dated Apr. 11, 2013, with an English translation.

* cited by examiner

Use History Information
Management Table 52a

| User ID |
| --- |
| Musical Piece ID |
| Number of Reproductions |
| Last Reproduction Date and Time |
| ... |

Fig. 4

Fan Management Table 52b

| User ID |
| --- |
| Artist ID |
| ... |

Fig. 5

Musical Piece
Management Table 52c

| Musical Piece ID |
| --- |
| Musical Piece Name |
| Artist ID |
| Image File Name |
| Album Name |
| Release Date |
| ... |

Fig. 6

Posting Information
Management Table 52d

| Posting Information ID |
| --- |
| User ID |
| Posting Date and Time |
| Artist ID |
| Musical Piece ID |
| Posting Information Contents |
| ... |

Fig. 7

SYSTEM CAPABLE OF PROVIDING PLURALITY OF DIGITAL CONTENTS AND METHOD USING SAME

CROSS-REFERENCE TO RELATED APPLICATIONS

This application is based on and claims the benefit of priority from Japanese Patent Application Serial No. 2013-063433 (filed on Mar. 26, 2013), the contents of which are hereby incorporated by reference in their entirety.

TECHNICAL FIELD

The present invention relates to a system and a method using the system. More specifically, the system is connected via a communication network to a plurality of terminals operated by users and provides a plurality of digital contents to the users.

BACKGROUND

Such systems conventionally proposed include a system for providing digital contents such as musical pieces, videos, games, electronic books wherein comments can be posted for used contents (see, e.g., Japanese Patent Application Publication No. 2013-025504). This system is configured such that comments can be added for contents on a streaming page for browsing the contents.

SUMMARY

Unfortunately, such a system allows adding of comments in each streaming of contents; and thus it is difficult to add comments for contents previously reproduced. Further, comments are added on the streaming page and thus are browsed only by users who has reached the streaming page of the corresponding contents. It is therefore difficult to provide chances for many users who may be interested in the contents to browse the comments.

One object of the embodiments of the present invention is to provide a system for facilitating posting for digital contents. Other objects of the embodiments of the present invention will be apparent with reference to the entire description in this specification.

The system according to an embodiment of the present invention is a system connected via a communication network to a plurality of terminals each operated by a user, the system being capable of providing a plurality of digital contents to the user, the system comprising: an information storage device configured to store at least use history information related to use history of the digital contents by the user; and one or more processors capable of executing a particular program, wherein the particular program comprises: a use history information sending module configured to send, in response to a request from any one of the plurality of terminals, the use history information to the terminal, the use history information corresponding to the user operating the terminal; a posting information reception module configured to receive, from the terminal, posting information including content specifying information specifying one or more digital contents selected by the user among digital contents included in the use history of the use history information sent to the terminal; a posting information registration module configured to store the received posting information in the information storage device; and a posting information sending module configured to send, in response to a request from any one of the plurality of terminals, the posting information stored in the information storage device to the terminal.

The system according to an embodiment of the present invention is a system connected via a communication network to a plurality of terminals each operated by a user, the system being capable of providing a plurality of digital contents to the user, the system comprising: an information storage unit configured to store at least use history information related to use history of the digital contents by the user; a use history information sending unit configured to send, in response to a request from any one of the plurality of terminals, the use history information to the terminal, the use history information corresponding to the user operating the terminal; a posting information reception unit configured to receive, from the terminal, posting information including content specifying information specifying one or more digital contents selected by the user among digital contents included in the use history of the use history information sent to the terminal; a posting information registration unit configured to store the received posting information in the information storage device; and a posting information sending unit configured to send, in response to a request from any one of the plurality of terminals, the posting information stored in the information storage device to the terminal.

The method according to an embodiment of the present invention is a method for providing a plurality of digital contents to a plurality of users by using a system connected via a communication network to a plurality of terminals each operated by one of the plurality of users, the system having an information storage device configured to store information, the method comprising the steps of: storing, in the information storage device, at least use history information related to use history of the digital contents by the user; sending, in response to a request from any one of the plurality of terminals, the use history information to the terminal, the use history information corresponding to the user operating the terminal; receiving, from the terminal, posting information including content specifying information specifying one or more digital contents selected by the user among digital contents included in the use history of the use history information sent to the terminal; storing the received posting information in the information storage device; and sending, in response to a request from any one of the plurality of terminals, the posting information stored in the information storage device to the terminal.

Various embodiments of the present invention provide a system for facilitating posting for digital contents.

BRIEF DESCRIPTION OF THE DRAWINGS

FIG. 4 is a diagram showing an example of a use history management table according to an embodiment.

FIG. 5 is a diagram showing an example of a fan management table according to an embodiment.

FIG. 6 is a diagram showing an example of a musical piece management table according to an embodiment.

FIG. 7 is a diagram showing an example of a posting information management table according to an embodiment.

DESCRIPTION OF EXAMPLE EMBODIMENTS

Figure 1:
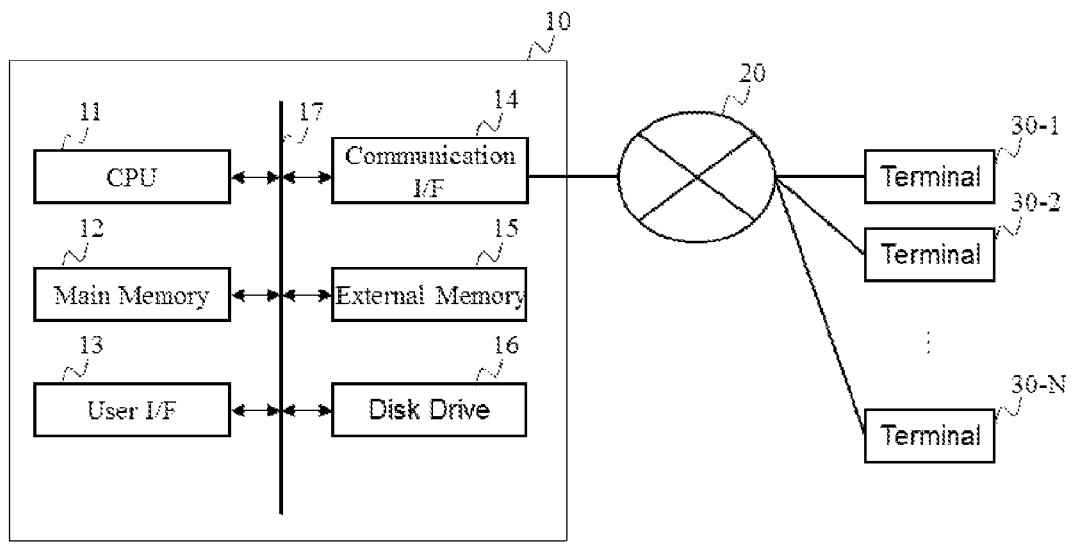
FIG. 1 is a block diagram schematically illustrating a network configuration including a system according to an embodiment of the present invention.

Various embodiments of the present invention will be described hereinafter with reference to the drawings. In the drawings, the same components are denoted by the same reference numerals.

FIG. 1 is a block diagram schematically illustrating a network configuration including a system 10 according to an embodiment of the present invention. As illustrated in FIG. 1, the system 10 according to an embodiment may be communicatively connected to a plurality of terminals 30-1, 30-2, . . . , and 30-N (hereinafter also collectively referred to as the "terminals 30"), each having a communication function, via a communication network 20 such as the Internet. The system 10 may provide users operating the terminals 30 with various digital contents such as musical pieces, videos, electronic books, and games.

As illustrated in FIG. 1, the system 10 according to an embodiment may include a central processing unit (CPU) (processor) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The external memory 15 may be formed of, for example, a magnetic disk drive and store a control program for controlling provision services of digital contents. The external memory 15 may also store various data used in the provision services of various digital contents. The various data that may be stored in the external memory 15 may also be stored on a database server communicatively connected to the system 10 and physically separate from the system 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, applications stored in a storage medium and various data for use in provision of the digital contents may be read by the disk drive 16, and may be installed into the external memory 15.

In an embodiment, the system 10 may be a web server for managing a web site including a plurality of hierarchical web pages and may be capable of providing the terminals 30 with various digital contents. The terminals 30 may fetch HTML data for rendering a web page from the system 10 and analyze the fetched HTML data to present the web page to a user of the terminals 30. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store applications to be executed on execution environments of the terminal 30 other than browser software. These applications may include programs for receiving provision services of digital contents and various data such as image data to be referred to for executing the programs. The programs may be created in, for example, object oriented languages such as Objective-C™ and Java™. The created programs may be stored on the external memory 15 in the form of application software along with various data. The application software stored on the external memory 15 may be delivered to a terminal 30 in response to a delivery request. The application software may not necessarily be directly delivered from the system 10 but may be delivered via another system or server communicatively connected to the system 10 and the terminal 30. The application software delivered from the system 10 may be received by the terminal 30 through a communication I/F 34 in accordance with the control of CPU 31; the received programs may be sent to an external memory 35 and stored thereon. The application software may be launched in accordance with the user's operation on the terminal 30 and may be executed on an execution environment implemented on the terminal 30 such as NgCore™ or Android™. The system 10 may provide the applications executed on the terminals 30 with various data required for provision services of digital contents. Additionally, the system 10 can store various data sent from the terminal 30 for each user, thereby managing the state of provided digital contents (e.g., playback of the musical pieces and videos and the progression of the games) for each user.

Thus, the system 10 may manage the web site for providing various digital contents and deliver web pages constituting the web site in response to a request from the terminal 30, thereby providing digital contents to a user. Also, the system 10 can provide digital contents based on communication with an application performed on the terminal 30 in place of, or in addition to, such browser-based provision services of digital contents. Whichever mode may be taken to provide the digital contents, the system 10 can store data required for the provision services of digital contents for each identification identifying a user. Briefly, the system 10 may also include a function to authenticate a user at start of the provision services of digital contents and perform charging process in accordance with provision of digital contents.

In an embodiment, the terminal 30 may be any information processing device that may display on a web browser a web page of a web site for the provision services of digital contents obtained from the system 10 and include an executing environment for executing applications.

Figure 2:
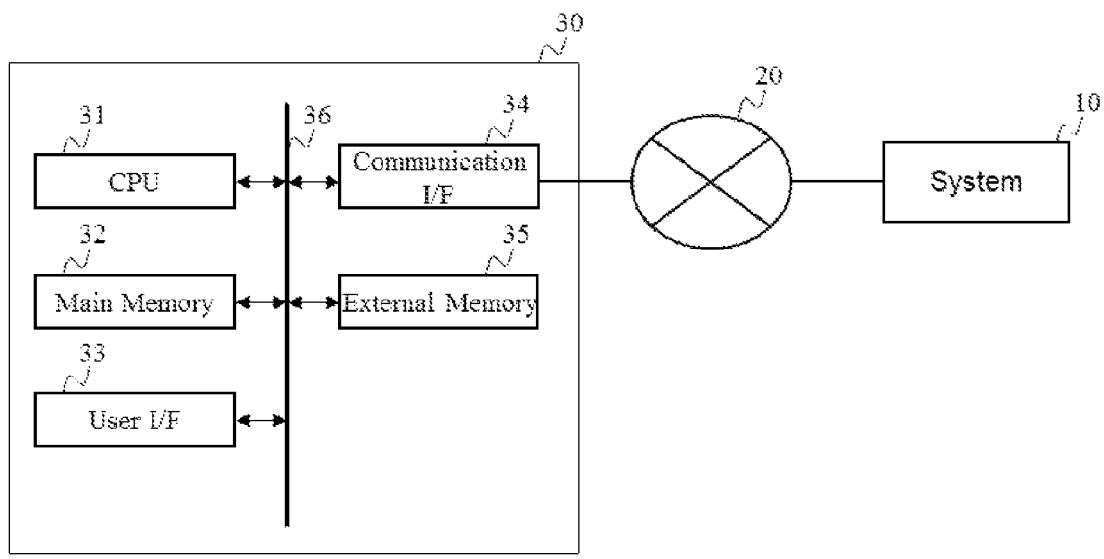
FIG. 2 is a block diagram schematically illustrating the architecture of a terminal according to an embodiment.

The architecture of the terminal 30 will now be described with reference to FIG. 2. FIG. 2 is a block diagram schematically illustrating the architecture of a terminal 30. As illustrated in FIG. 2, the terminal 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the system 10 via the communication network 20.

The external memory 35 may comprise, for example, a magnetic disk drive or a flash memory and store various programs such as an operating system. When receiving an application from a system 10 via the communication I/F 34, the external memory 35 may store the received application.

A terminal 30 having such an architecture may include, for example, browser software for interpreting an HTML file (HTML data) and rendering a screen; this browser software may enable the terminal 30 to interpret the HTML data fetched from the system 10 and render web pages corresponding to the received HTML data. Further, the terminal 30 may include plug-in software (e.g., Flash Player distributed by Adobe Systems Incorporated) embedded into browser software; therefore, the terminal 30 can fetch from the system 10 a SWF file embedded in HTML data and execute the SWF file by using the browser software and the plug-in software.

When a provision service of digital contents is received on the terminal 30, for example, animation or an operation icon designated by the program may be displayed on a screen of the terminal 30. The user may enter an instruction for receiving the provision service of digital contents using an input interface of the terminal 30. The instruction entered by the user may be transmitted to the system 10 through the browser of the terminal 30 or a function of an execution environment such as NgCore™.

Figure 3:
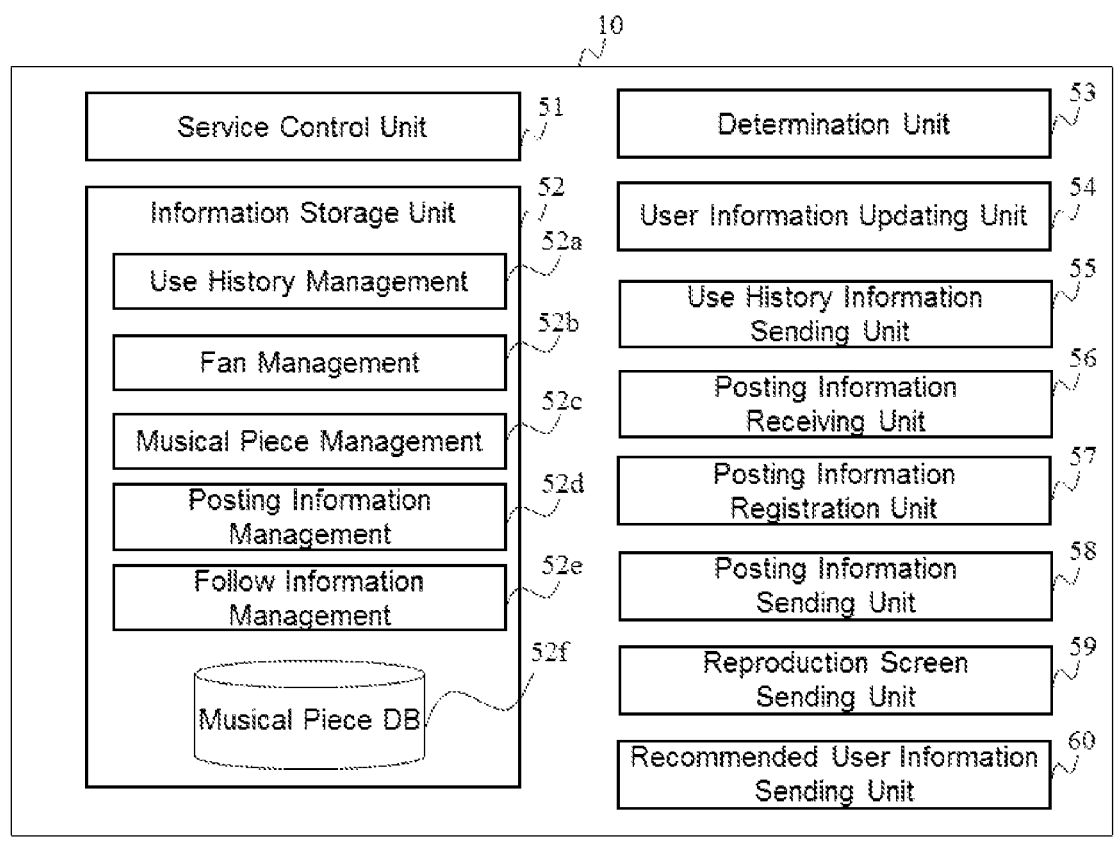
FIG. 3 is a block diagram illustrating the functionality of the system according to an embodiment.

Next, the functionality of the system 10 implemented by the components shown in FIG. 1 will now be described. As described above, the system 10, which can provide various digital contents, will now be described with a focus on functions related to services for providing musical pieces. Musical pieces are examples suitable for description of an embodiment of the present invention. FIG. 3 is a block diagram illustrating the functionality of a system 10 according to an embodiment of the present invention. As shown, the system 10 may comprise: a service control unit 51 for controlling the entire services for providing digital contents; an information storage unit 52 for storing information; a determination unit 53 for determining that a user satisfying predetermined conditions related to reproduction history (use history) of one or more musical pieces (digital contents) of an artist (classification information) is a fan (specific user) of this artist a user information updating unit 54 for storing a determination result by the determination unit 53 in the information storage unit 52; a use history information sending unit 55 for sending, in response to a request from a terminal 30, reproduction history information (use history information) corresponding to the user operating the terminal 30; a posting information reception unit 56 for receiving, from the terminal 30, posting information including musical piece specifying information (content specifying information) that can specify a musical piece selected by the user operating the terminal 30 from musical pieces included in reproduction history of the reproduction history information sent; a posting information registration unit 57 for storing received posting information in the information storage unit 52; a posting information sending unit 58 for sending, in response to a request from the terminal 30, the posting information stored in the information storage unit 52 to the terminal 30; a reproduction screen sending unit 59 for sending, to the terminal 30, screen data of a musical piece reproduction screen (content use screen) for reproducing (using) a musical piece; and a recommended user information sending unit 60 for determining that a part or all of other users determined to be fans of an artist of which the user is determined to be a fan are recommended users to be recommended to the user and sending information on the recommended users to the terminal 30. These functions may be implemented through cooperation between the CPU 11 of the system 10 and various programs and tables stored in the main memory 12 and the external memory 15, wherein, for example, the CPU 11 performs a program including at least part of modules corresponding to the functions of the service control unit 51, determination unit 53, user information updating unit 54, use history information sending unit 55, posting information reception unit 56, posting information registration unit 57, posting information sending unit 58, reproduction screen sending unit 59, and recommended user information sending unit 60. The musical piece specifying information (content specifying information) for specifying a musical piece is not limited to a particular form and may be any information that can specify a musical piece (digital content) selected by the user, including a "content ID" directly specifying a digital content, and other information or a combination thereof that can specify a digital content like the "content ID."

The service control unit 51 may send and receive various data required for services for providing digital contents to and from the terminal 30 and manage such data for each user, thereby controlling services for providing digital contents for each user. For example, the service control unit 51 can sequentially display, on the terminal 30, web pages constituting a web site for providing services in response to a request from the terminal 30. When a hyperlink on the displayed web page is selected by the user, the service control unit 51 may send new HTML data corresponding to the hyperlink to the terminal 30. The terminal 30 may display a web page based on the new HTML data. Thus, the service control unit 51 may control the service such that web pages stored on the system 10 are sequentially provided to the terminal 30 in accordance with the operation by the user; and the user can receive the service based on his own operation through the function of the service control unit 51.

The terminal 30 can appropriately send to the system 10 various information to be used in the services for providing digital contents by using the functions of browser software and applications. The service control unit 51 may store, for each user, various information received from a plurality of terminals 30, thereby controlling the services for providing digital contents for each user.

The information storage unit 52 may comprise: a use history management table 52a for managing information on reproduction history of musical pieces by a user; a fan management table 52b for managing information on determination result by the determination unit 53 on whether a user is a fan of an artist a musical piece management table 52c for managing musical piece information (content information) on musical pieces; a posting information management table 52d for managing posting information received from the terminal 30; a follow information management table 52e for managing information on other users followed by a user; and a musical piece database 52f serving as a database of musical piece data.

FIG. 4 shows an example of information managed by the use history management table 52a. As shown, the use history management table 52a may manage, in association with the combination of "user ID" for identifying a user and "musical piece ID" for identifying a musical piece, information such as "number of reproductions" indicating the number of times when the user reproduced the musical piece and "last reproduction date and time" indicating the date and time when the user reproduced the musical piece last. The use history management table 52a may be updated by the service control unit 51 each time the terminal 30 operated by the user reproduces a musical piece. In the services provided by the system 10 for providing musical pieces, a user can select a reproduction method for reproducing a musical piece from among the following three reproduction methods: "trial playback" wherein only a part (e.g., a melodious part) of the musical piece data is reproduced by streaming, "full playback" wherein the entirety of the musical piece data is reproduced by streaming; and "download" (purchase) wherein the entirety of the musical piece data is downloaded. In an embodiment, "trial playback" may not be counted into the "number of reproductions"; "full playback" may be counted into the "number of reproductions" when the entirety of the musical piece data has been streamed; and "download" may be counted into the "number of reproductions" when the musical piece data has been downloaded. Various methods of counting the "number of reproductions" may be employed in place of the above method. For example, "full playback" may be counted into the "number of reproductions" at the timing when a predetermined amount of time or more (1 minute or more) of musical piece data has been streamed before the entirety of the musical piece data has been streamed; and for "download," a predetermined number (e.g., ten) may be added to the "number of reproductions" when download is completed on assumption of reproductions of the musical piece data on the terminal 30 or other devices after download that cannot be managed by the system 10.

FIG. 5 shows an example of information managed by the fan management table 52b. As shown, the fan management table 52b may manage information such as the combination of "user ID" identifying a user and "artist ID" identifying an artist of which the user is determined to be a fan.

FIG. 6 shows an example of information managed by the musical piece management table 52c. As shown, the musical piece management table 52c may manage, in association with "musical piece ID" identifying a musical piece, information such as "musical piece name" indicating the name of the musical piece, "artist ID" identifying the artist for the musical piece, "image file name" indicating the image file corresponding to the musical piece, "album name" indicating the name of album including the musical piece, and "release date" indicating the release date of the musical piece or the album including the musical piece. The image file indicated by the "image file name" may be stored in an appropriate region in the information storage unit 52. Further, the musical piece management table 52c may manage other information related to the musical piece such as meta data. For example, the musical piece management table 52c may manage URLs of musical piece reproduction screens (described later) for reproducing the musical piece. The above information managed by the musical piece management table 52c may also be managed by the musical piece database 52f along with musical piece data.

FIG. 7 shows an example of information managed by the posting information management table 52d. As shown, the posting information management table 52d may manage, in association with "posting information ID" identifying individual posting information such as posting by the user and various articles, information such as "user ID" identifying a user who posted the posting information, "posting date and time" indicating the date and time when the posting information was posted, "artist ID" identifying the artist related to the posting information; "musical piece ID" identifying a musical piece related to the posting information; and "posting information contents" indicating the contents of the posting information. In an embodiment, the posting information managed by the posting information management table 52d may include the posting by the user and various articles provided by the administrator of the system 10. The various articles provided by the administrator may be automatically recorded in cooperation with external websites and databases; and information including links to the external websites and databases may be recorded as "posting information contents." Further, in various articles provided by the administrator, "user ID" is set to an ID identifying a source of the various articles, and "posting date and time" may be set to the date and time when the various articles were recorded.

Figure 8:
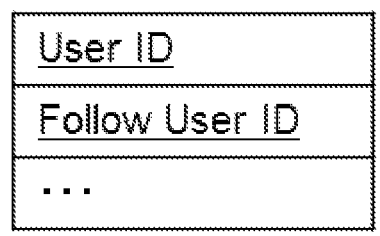
FIG. 8 is a diagram showing an example of a follow information management table according to an embodiment.

FIG. 8 shows an example of information managed by the follow information management table 52e. As shown, the follow information management table 52e may manage information related to the combination of "user ID" identifying a user and "follow user ID" identifying other users followed by the user.

The musical piece database 52f may store musical piece data that can be provided to users in a file format such as Advanced Audio Coding (AAC) and Windows™ Media Audio (WMA). The musical piece database 52f may not necessarily be located within the system 10, and may also be located in other systems, servers, or databases communicatively connected to the system 10.

Figure 9:
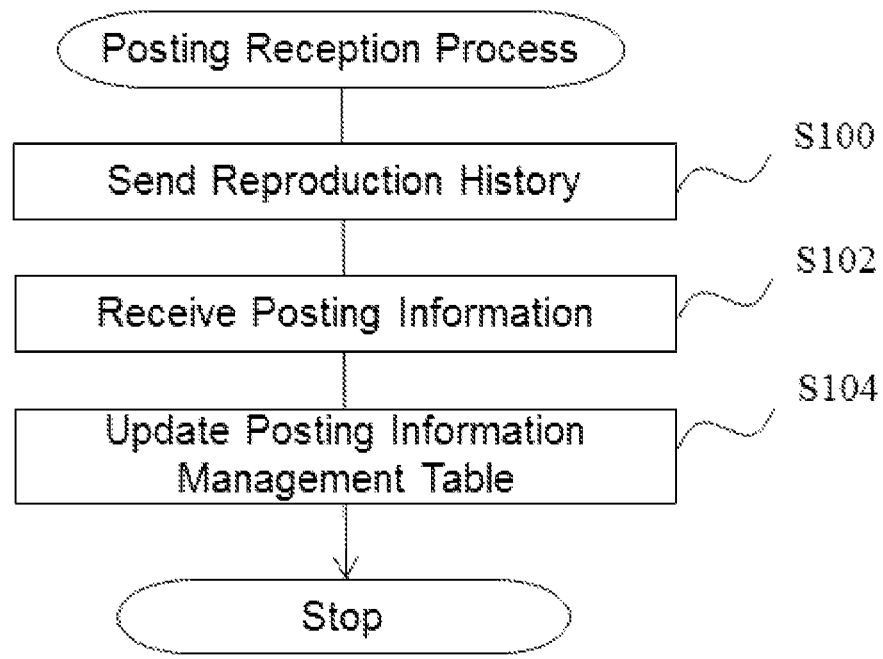
FIG. 9 is a flow diagram showing an example of a posting reception process according to an embodiment.

Next, operations of the above system 10 as an embodiment of the present invention will now be described. First to be described are operations related to posting by a user. FIG. 9 is a flow diagram showing an example of a posting reception process performed by the system 10. The posting reception process may be performed when the system 10 received a signal for requesting reproduction history information of a musical piece from the terminal 30. For convenience, the posting reception screen for receiving posting from a user will be described first.

Figure 10:
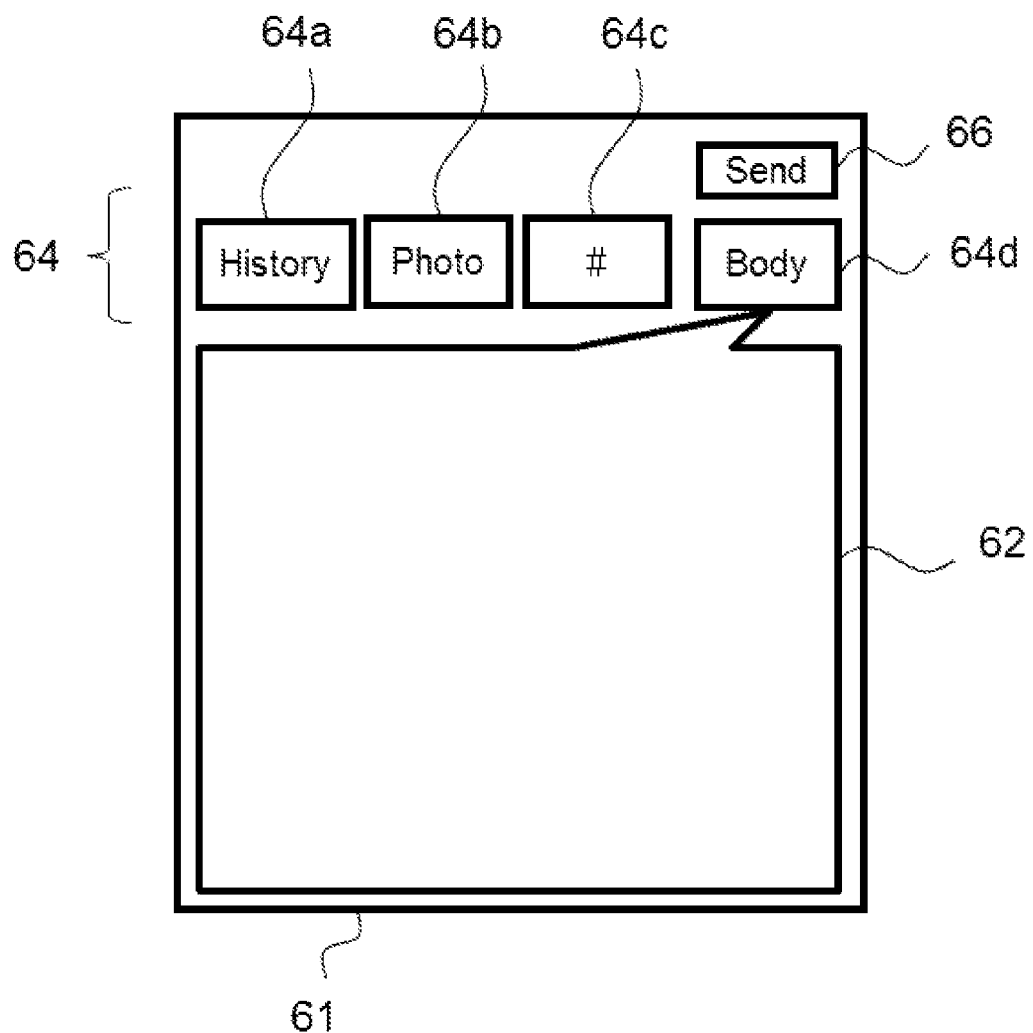
FIG. 10 is a diagram showing a display mode of a posting reception screen according to an embodiment.

FIG. 10 is a diagram showing an example of the posting reception screen 61 for receiving posting from a user. The posting reception screen 61 may be reached in response to a user operation operating the terminal 30 from a main screen (described later) which is a basic screen for receiving the service for providing musical pieces. As shown, the posting reception screen 61 may comprise: a main display section 62; a display switch instruction section 64 for switching the contents displayed in the main display section 62; and a sending button 66 for sending inputted posting information to the system 10. The display switch instruction section 64 may comprise: a history display button 64a for displaying information on musical pieces included in the reproduction history of the user operating the terminal 30; an image display button 64b for displaying an image such as a photograph owned by the user; a hash tag (#) display button 64c for displaying a hash tag that can be selected for insertion into the posting information; and a body input button 64d for inputting a body of posting. When the user selects a history display button 64a of the posting reception screen 61, the terminal 30 may send to the system 10 a signal for requesting reproduction history information of musical pieces.

Figure 11:
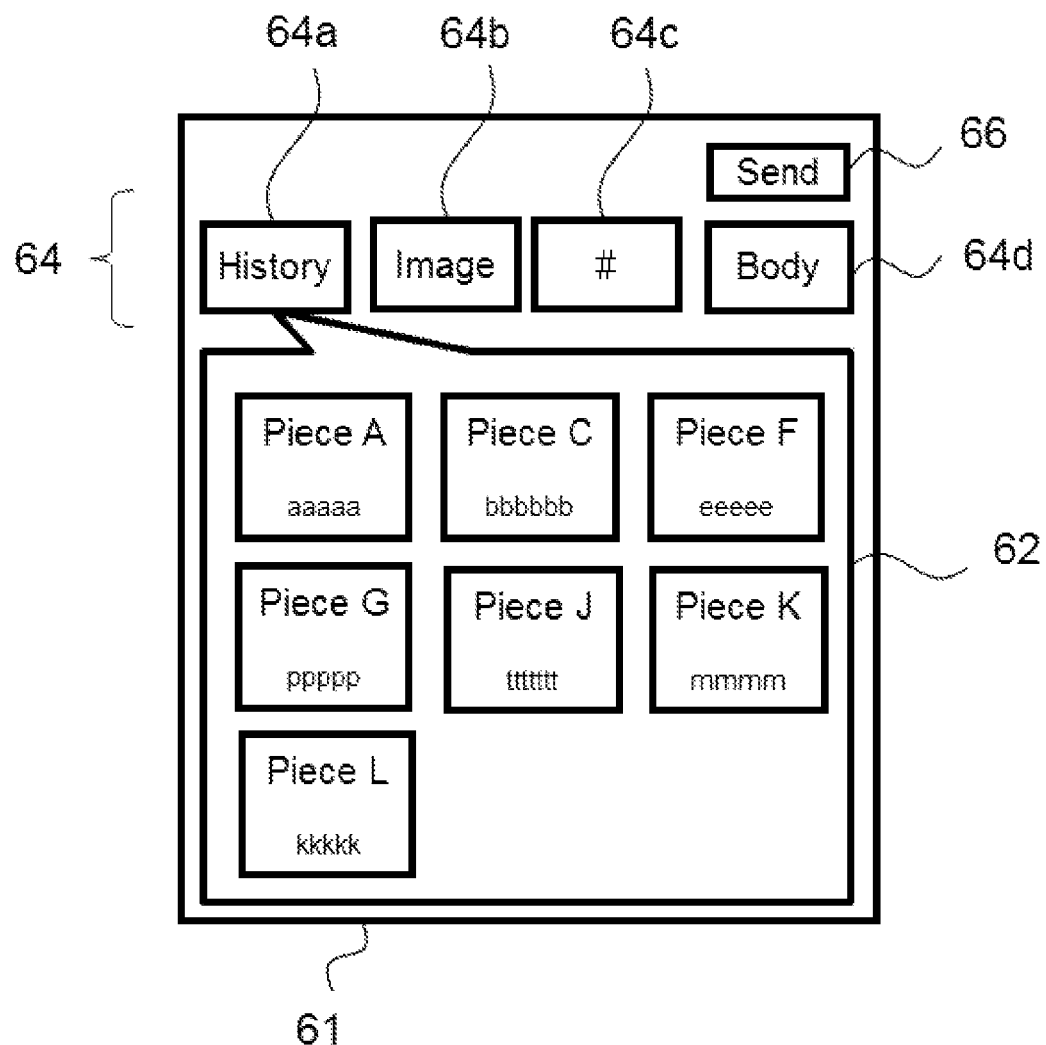
FIG. 11 is a diagram showing a display mode of the posting reception screen according to an embodiment.

Returning to FIG. 9, the first step of the posting reception process may be to send to the terminal 30 reproduction history information of the musical pieces corresponding to the user operating the terminal 30 (step S100). More specifically, the system 10 may access the use history management table 52a to specify a "musical piece ID" stored in combination with the "user ID" of the user operating the terminal 30, fetch from the musical piece management table 52c musical piece information related to the musical piece specified by the "musical piece ID," and send the fetched musical piece information to the terminal 30. FIG. 11 is a diagram showing a display mode of the posting reception screen 61 wherein the user selected the history display button 64a and the reproduction history information of the musical piece sent from the system 10 is displayed. As shown, when the terminal 30 receives the reproduction history information of the musical piece, the main display section 62 of the posting reception screen 61 may display a list of musical piece information related to the musical pieces included in the reproduction history of the reproduction history information. In the example shown in FIG. 11, a musical piece name (e.g., "Musical Piece A") and an artist name (e.g., "aaaaa") are superposed on an image (image file) corresponding to the musical piece as musical piece information for each musical piece displayed in the list. The user operating the terminal 30 can select a musical piece to be related to the posting from among the list of the musical pieces displayed in the main display section 62. In the example shown in FIG. 11, a musical piece name and an artist name may be superposed on an image corresponding to the musical piece; alternatively, other musical piece information may be displayed in other ways. For example, it may also be possible to display only the musical piece name. Further, the musical piece information displayed in the list may be sorted by a predetermined rule (e.g., sorted in the descending order of the number of reproductions, or in the descending order of last reproduction date and time) or may be narrowed down by a predetermined rule (e.g., narrowed down to musical pieces that have been reproduced for a predetermined number of times or more or to musical pieces of which the last reproduction date and time is within a predetermined range from the current date and time).

Figure 12:
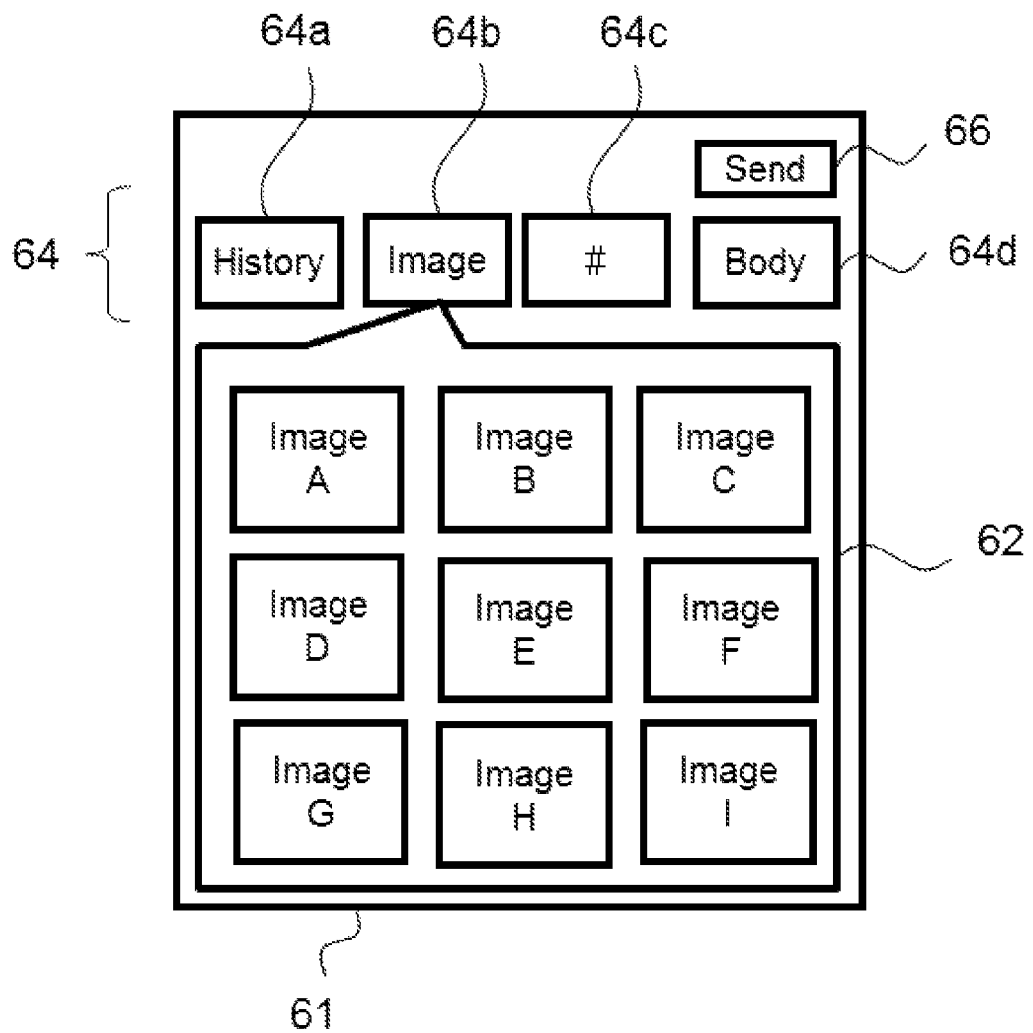
FIG. 12 is a diagram showing a display mode of the posting reception screen according to an embodiment.
Figure 13:
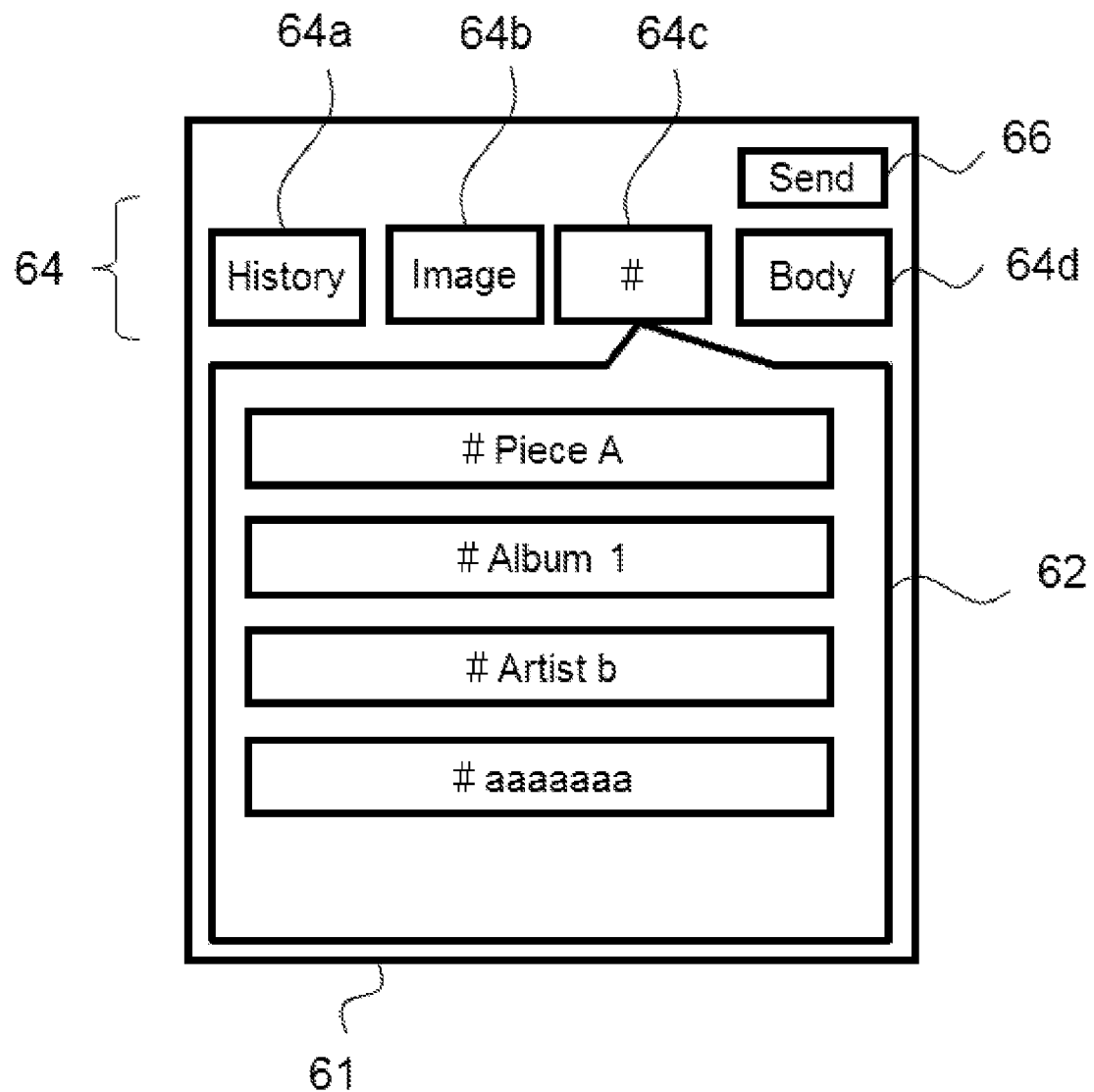
FIG. 13 is a diagram showing a display mode of the posting reception screen according to an embodiment.

After thus sending to the terminal 30 the reproduction history information of the musical pieces corresponding to the user, the system 10 may receive posting information from the terminal 30 (step S102). The method for the user to input posting information through the posting reception screen 61 is described below. As described above, the user can first select a musical piece to be related to the posting from among the musical pieces displayed in the main display screen 62 upon selection of the history display button 64a of the posting reception screen 61. As shown in FIG. 12, when the user operating the terminal 30 selects the image display button 64b of the posting reception screen 61, the main display section 62 may display a list of image files such as photographs owned by the user. The image files displayed in a list in the main display section 62 may include, for example, image files stored in a predetermined folder on the external memory 35 of the terminal 30 and image files stored on the system 10 or other servers as image files owned by the user operating the terminal 30. The user can select an image file to be inserted in the posting information from among the image files thus displayed in a list. As shown in FIG. 13, when the user operating the terminal 30 selects the hash tag display button 64c of the posting reception screen 61, the main display section 62 may display a list of selectable hash tags. The hash tags displayed in the list in the main display section 62 may include those previously used by the user operating the terminal 30 and those frequently used by users using the service of the system 10 for providing musical pieces. The user can select a hash tag to be inserted in the posting information from among the hash tags thus displayed in a list. The user can also insert a hash tag into the posting information by inputting a hash tag into the body text of the posting (described later) The hash tag inserted into the posting information may be used as a search key with which the users retrieve and extract the posting information.

Figure 14:
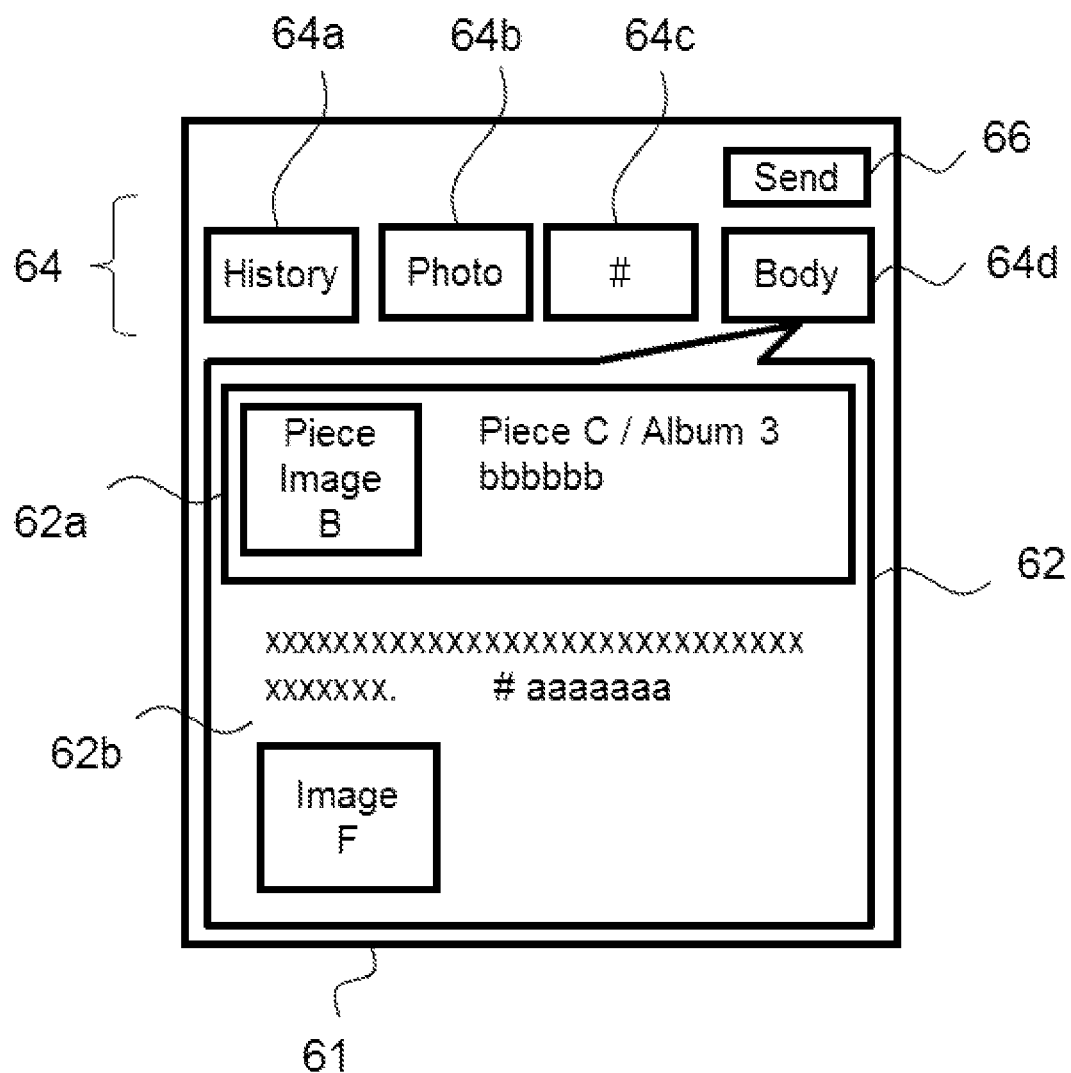
FIG. 14 is a diagram showing a display mode of the posting reception screen according to an embodiment.

FIG. 14 is a diagram showing an example of a display mode of the posting reception screen 61 wherein the user selected the body input button 64d of the posting reception screen 61. When the body input button 64d is selected, the main display section 62 of the posting reception screen 61 may display the contents of the currently inputted posting information. As shown, when the history display button 64a is previously selected to select a musical piece to be related to the posting from among the musical pieces included in the reproduction history, musical piece information related to the selected musical piece may be displayed in the musical piece information display area 62a. As shown, the musical piece information display area 62a may contain an image corresponding to the musical piece in the left and a musical piece name (e.g., "Musical Piece C"), an album name (e.g., "Album 3"), and an artist name (e.g., "bbbbbb") in the right. The musical piece information displayed in the musical piece information display area 62a may be stored in the main memory 32, etc. of the terminal 30 when the history display button 64a is selected to select a musical piece to be related to the posting from among the musical pieces included in the reproduction history; alternatively, it may also be possible that only the "musical piece ID" of the musical piece should be stored in the main memory 32, etc. when a musical piece to be related to the posting is selected from among the musical pieces included in the reproduction history and, when the body input button 64d is selected, the "musical piece ID" should be used to retrieve musical piece information from the system 10 (musical piece management table 52c) for display.

Below the musical piece information display area 62a may be displayed a text input field 62b wherein the user can input the body text of the posting. As shown, if the image display button 64b is previously selected to select a desired image file, the text input field 62b may display the selected image file ("image F" in the example shown in FIG. 14). Similarly, if the hash tag display button 64c is previously selected to select a desired hash tag, the selected hash tag may be displayed ("#aaaaaa" in the example shown in FIG. 14). Thus, the user may confirm, in the main display section 62, the information on the musical piece related to the posting by selecting the history display button 64a, the image file inserted into the posting information by selecting the image display button 64b, and the hash tag inserted into the posting information by selecting the hash tag display button 64c; and the user can input the body text of the posting into the text input field 62b.

When the user operating the terminal 30 thus inputs the posting information through the posting reception screen 61 and select Send button 66, the inputted posting information may be sent from the terminal 30 and received by the system 10. Alternatively, among the posting information sent from the terminal 30, the information on the musical piece related to the posting by selecting the history display button 64a may be only the "musical piece ID" identifying the musical piece.

Subsequently, the system 10 may update the posting information management table 52d by using the posting information received from the terminal 30 (step S104) and end the posting reception process. More specifically, the posting information management table 52d may be updated such that, among the information managed by the posting information management table 52d, the "posting date and time" is set to the current date and time managed by the system 10 and the "artist ID" may be set to the "artist ID" identifying the artist for the musical piece related to the posting contents. Further, the "musical piece ID" may be set to the "musical piece ID" of the musical piece related to the posting information; and the "posting information contents" may be set to the information inputted into the text input field 62b of the posting reception screen 61 (body text, image files, and hash tags). As for the image file inputted into the text input field 62b in the posting reception screen 61, the "posting information contents" may be set to the link information to the location where the image file is stored, and the image file may be stored in an appropriate region in the information storage unit 52. The posting reception process shown in FIG. 9 may be performed when the user selects the history display button 64a of the posting reception screen 61, wherein the system 10 can receive the posting information from the terminal 30 and record the received posting information in the posting information management table 52b without sending the reproduction history information of the musical pieces (i.e., without relating the musical pieces to the posting information).

Figure 15:
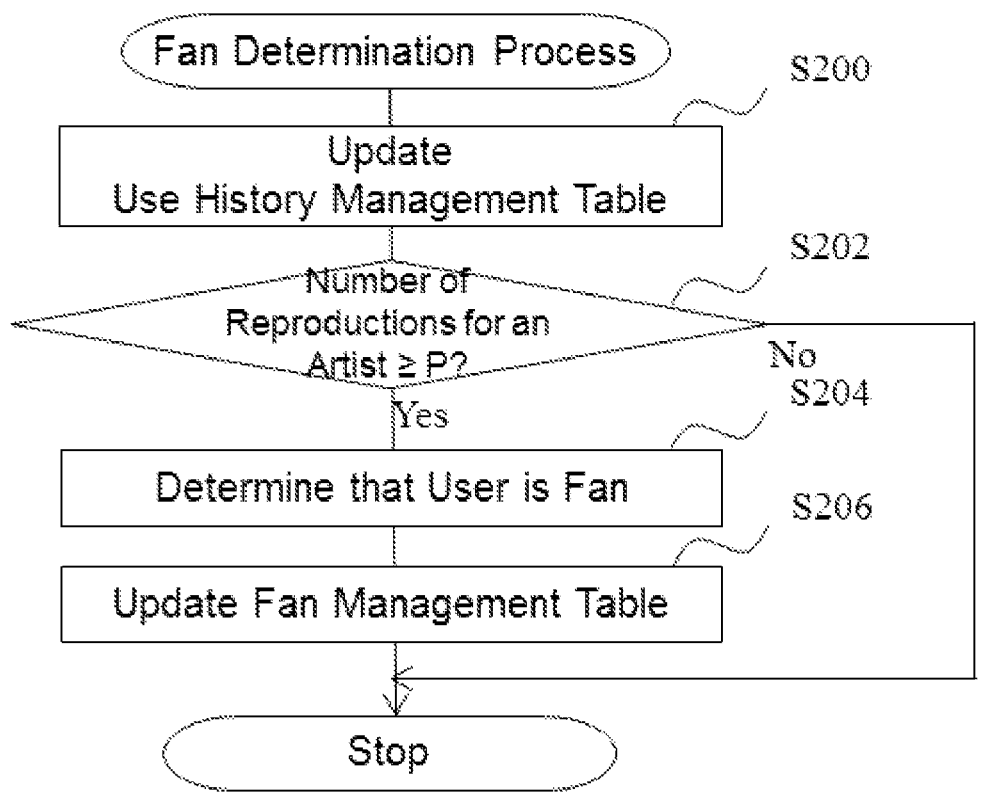
FIG. 15 is a flow diagram showing an example of a fan determination process according to an embodiment.

The above is a description on the operations related to posting by a user. Next, operations related to determination of a fan of an artist will now be described. FIG. 15 is a flow diagram showing an example of a fan determination process performed by the system 10. The fan determination process may be performed when the user of the terminal 30 completes reproduction of a musical piece. The timing "when . . . completes reproduction of a musical piece" refers to the timing when the reproduction of the musical piece is completed such that the reproduction may be counted into the "number of reproductions." In an embodiment, the above timing may correspond to the timing when streaming of the entirety of musical piece data is completed in the "full playback" method or when downloading of musical piece data is completed in the "download" method.

As shown, the first step of the fan determination process may be to update the use history management table 52a with respect to the completed reproduction of a musical piece (step S200). More specifically, a record corresponding to the combination of the "user ID" of the user operating the terminal 30 and the "musical piece ID" of the musical piece of which the reproduction is completed may be updated. More specifically, when the user reproduced the musical piece for the first time, the corresponding record may be newly created wherein the "number of reproductions" may be set to "1"; and when the user has previously reproduced the musical piece, "1" may be added to the "number of reproductions" in an existing record. The "last reproduction data and time" may be set to the current date and time.

Next, the numbers of reproductions by the user for all the musical pieces of the artist for the musical piece of which the reproduction has been completed may be totaled; and if the totaled number of reproductions is equal to or greater than a predetermined number of times P (e.g., five), this user may be determined to be a fan of the artist (steps S202, S204). More specifically, the total of the numbers of reproductions may be found as follows: all the musical pieces of the artist for the musical piece of which the reproduction has been completed may be specified by referring to the musical piece management table 52c; the numbers of reproductions by the user for all the specified musical pieces may be specified by referring to the use history management table 52a; and the specified numbers of reproductions may be totaled.

If the user is determined to be a fan of the artist, the system 10 may record the determination result in the fan management table 52b (step S206) and end the fan determination process. More specifically, the combination of the "user ID" of the user determined to be a fan and the "artist ID" of the artist may be recorded in the fan management table 52b. Further, in addition to the fan determination by the fan determination process, the user operating the terminal 30 can record himself as a fan of an artist. In this case, the user operating the terminal 30 who is a fan of an artist may send information on the artist through an appropriate screen; and the system 10 may record the artist in the fan management table 52b based on the sent information.

Thus, in the system 10 according to the embodiment, a user whose total number of reproductions of one or more musical pieces (digital contents) of an artist (classification information) is equal to or greater than a predetermined number of times P may be determined to be a fan (specific user) of the artist. Accordingly, in the circumstances where a user uses various musical pieces, artists attracting the user can be readily determined, and the preferences of the user in musical pieces can be properly determined.

Figure 16:
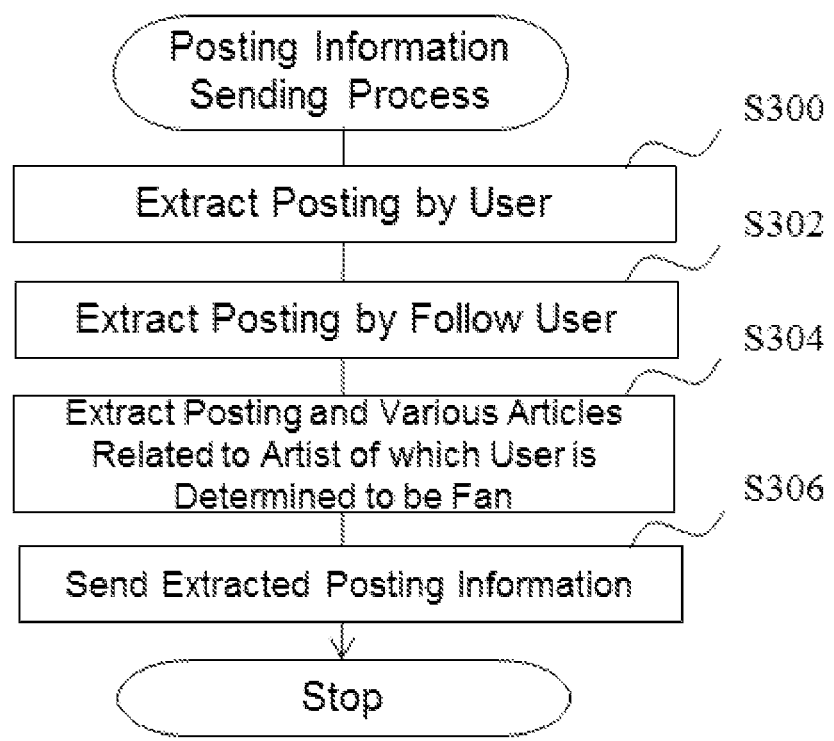
FIG. 16 is a flow diagram showing an example of a posting information sending process according to an embodiment.

The above is a description on the operations related to determination of a fan of an artist. Next, the operations of sending posting information to the terminal 30 will now be described. FIG. 16 is a flow diagram showing an example of a posting information sending process performed by the system 10. The posting information sending process may be performed when a display request for a screen containing posting information is received from a terminal 30. As shown, the first step of the posting information sending process may be to extract the posting information posted by the user operating the terminal 30 from the posting information management table 52d (step S300). More specifically, the system 10 may extract, from the posting information management table 52d, records of which the "user ID" is the "user ID" of the user operating the terminal 30.

Next, the system 10 may extract the posting information posted by a follow user of the user operating the terminal 30 from the posting information management table 52d (step S302). More specifically, the system 10 may specify the "user ID" ("follow user ID") of a follow user of the user operating the terminal 30 by referring to the follow information management table 52e, and extract records of which "user ID" is set to the specified "user ID" of the follow user from the posting information management table 52d.

Subsequently, the system 10 may extract posting information (posting and various articles) related to an artist of which the user operating the terminal 30 is determined to be a fan (step S304). More specifically, the system 10 may specify the "artist ID" of an artist of which the user operating the terminal 30 is determined to be a fan by referring to the fan management table 52*b*, and extract records of which "artist ID" is set to the specified "artist ID" of the artist from the posting information management table 52*d*. Thus, in the system 10 according to an embodiment, posting information related to an artist of which a user is determined to be a fan; therefore, posting information can be extracted in accordance with the preference of the user in musical pieces.

Figure 17:
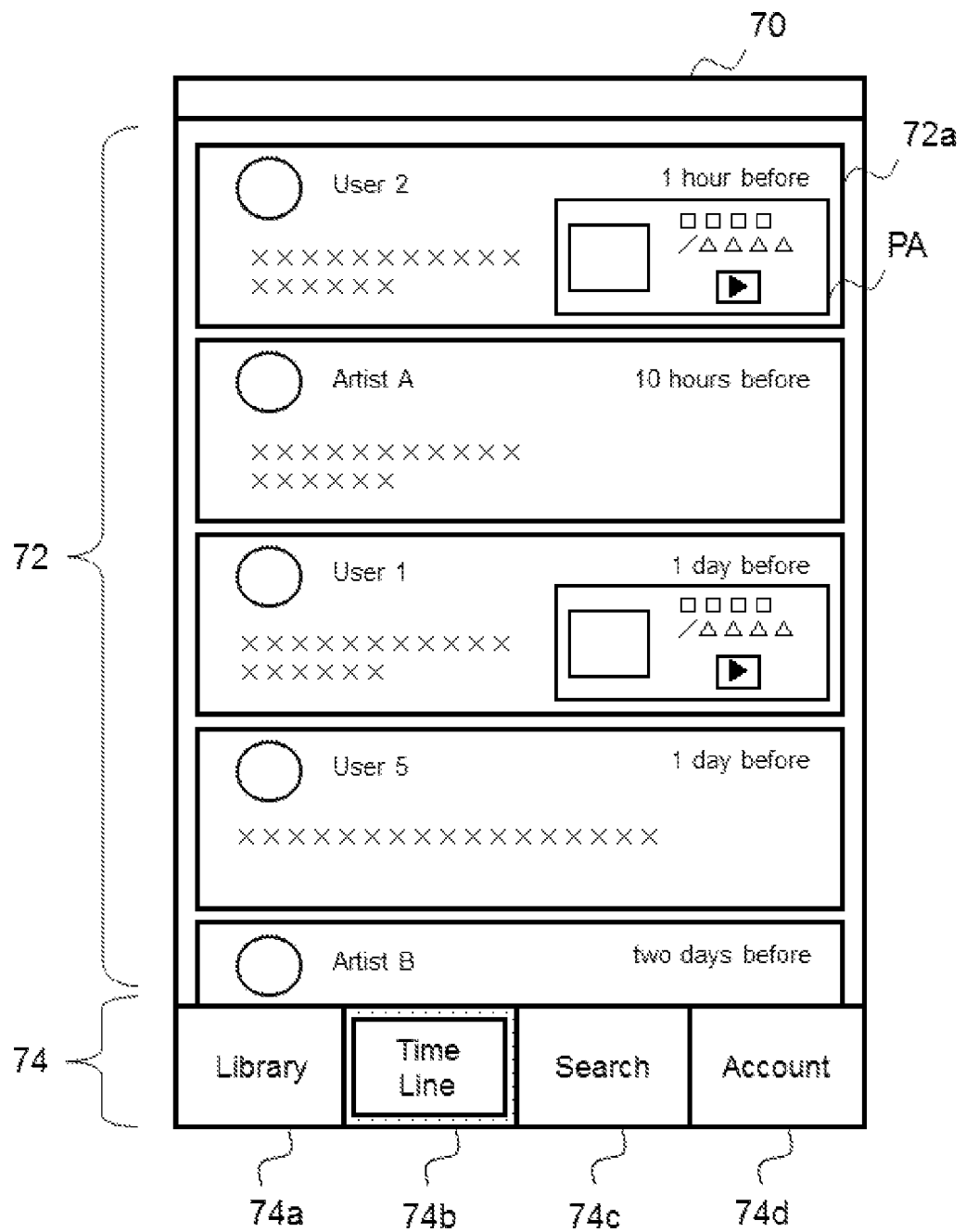
FIG. 17 is a diagram showing a display mode of a main screen according to an embodiment.

Thus, the system 10 may extract, from the posting information managed by the posting information management table 52*d*, posting information posted by the user operating the terminal 30, posting information posted by the follow user, and posting information related to the artist of which the user is determined to be a fan; and then, the system 10 may generate a screen data of a screen containing the above posting information and send the screen data to the terminal 30 (step S306), then ending the posting information sending process. FIG. 17 is a diagram showing a display mode of the main screen 70 as an example of a screen containing the posting information displayed on the terminal 30. The main screen 70 may be a basic screen for receiving the services for providing musical pieces and, as shown, comprises a main display section 72 and a display switch instruction section 74 for switching the contents displayed in the main display section 72. The display switch instruction section 74 may comprise: Library button 74*a* for displaying musical pieces that can be provided by the system 10; Time Line button 74*b* for displaying posting information; Search button 74*c* for searching for artist pages containing information related to a particular artist and other users; and Account button 74*d* for displaying basic information of the user. In the example shown in FIG. 17, Time Line button 74*b* in the display switch instruction section 74 is selected; and the main display section 72 displays posting information in a list. This posting information is the above posting information extracted by the posting information sending process and sent to the terminal 30. The posting information may be sorted in the descending order of, e.g., posting date and time (managed in the "posting date and time" of the posting information management table 52*d*) (i.e., in the descending order of recentness). As shown, the posting information displayed in the main screen 70 comprises an image and a name in the upper left corner specifying the user who posted the posting information or the source of the various articles, the elapsed time or days after the posting information has been posted or recorded in the upper right corner, and the contents of the posting and various articles (in text or images) in the lower half.

As shown in the posting information 72*a*, if the posting information is related to a musical piece, a musical piece reproduction requesting area PA is displayed for requesting the reproduction of the musical piece. The musical piece reproduction requesting area PA may contain basic information of the musical piece (an image, musical piece name, artist name corresponding to the musical piece) and a playback button. The basic information of the musical piece displayed in the musical piece reproduction requesting area PA is the musical piece information of the musical piece specified by the "musical piece ID" of the posting information management table 52*d*, the musical piece information being retrieved from the musical piece management table 52*c* and inserted into the posting information to be sent to the terminal 30.

When the user operating the terminal 30 selects the playback button in the musical piece reproduction requesting area PA, the terminal 30 may send to the system 10 a signal for requesting screen data of the musical piece reproduction screen 80 for reproducing the corresponding musical piece; and in response, the system 10 may send the screen data of the musical piece reproduction screen 80 to the terminal 30. When the terminal 30 requests from the system 10 the screen data of the musical piece reproduction screen 80, the "musical piece ID" of the musical piece to be reproduced may also be sent.

Figure 18:
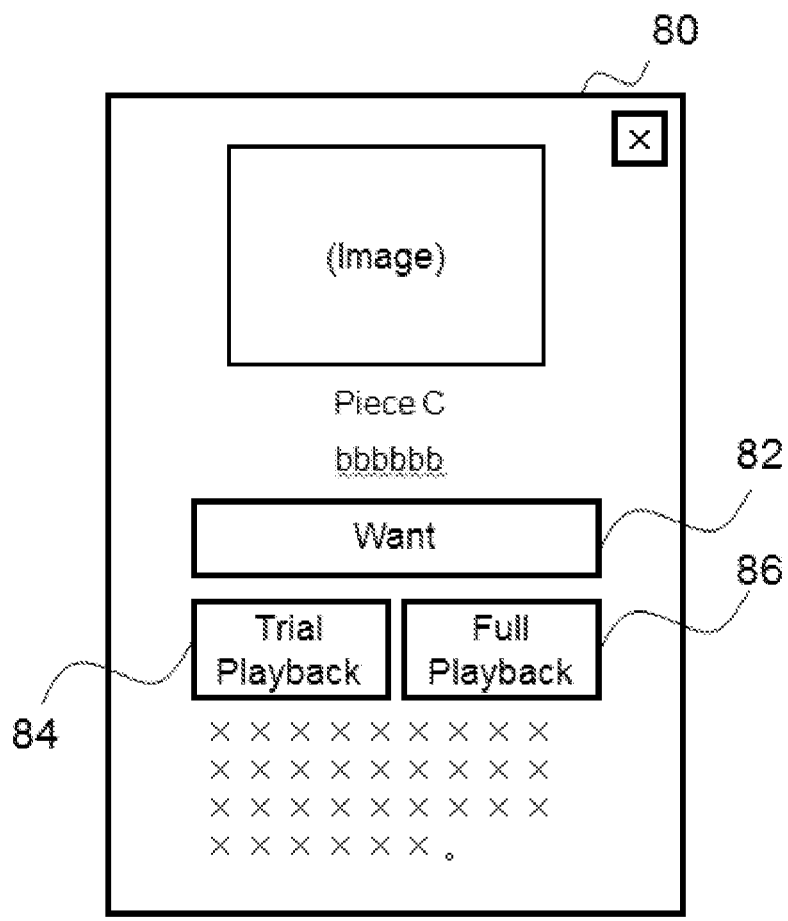
FIG. 18 is a diagram showing an example of a musical piece reproduction screen according to an embodiment.

FIG. 18 is a diagram showing an example of a musical piece reproduction screen 80 (content use screen). The musical piece reproduction screen 80 may be a screen to pop up when the terminal 30 has received corresponding screen data and, as shown, may contain: basic information of the musical piece (an image, musical piece name, an artist name, etc. corresponding to the musical piece) in the upper portion of the screen; and purchase ("Want") button 82 for "downloading" (purchasing) a musical piece, a trial playback button 84 for "trial playback" of a musical piece, and a full playback button 86 for "full playback" of a musical piece in the lower portion of the screen. The basic information on the musical piece displayed in the upper portion of the screen may be musical piece information on the musical piece specified by the "musical piece ID" sent from the terminal 30; and this musical piece information has been fetched from the musical piece management table 52*c* and sent to the terminal 30. When the user operating the terminal 30 selects the purchase button 82, the entirety of the musical piece data of the corresponding musical piece stored in the musical piece database 52*f* may be downloaded; when the user selects the trial playback button 84, only a part of the musical piece data may be streamed; and when the user selects the full playback button 86, the entirety of the musical piece data may be streamed. Thus, the user operating the terminal 30 may find posting information displayed in the main screen 70, e.g., posting information posted by a follow user, and then reproduce the musical piece via the musical piece reproduction screen 80. It may also be possible that, when the user selects the purchase button 82, the musical piece should be entered into a list of musical pieces to be downloaded (purchased), instead of being downloaded immediately. In this case, the musical piece data may be downloaded via a downloading screen based on this list.

Figure 19:
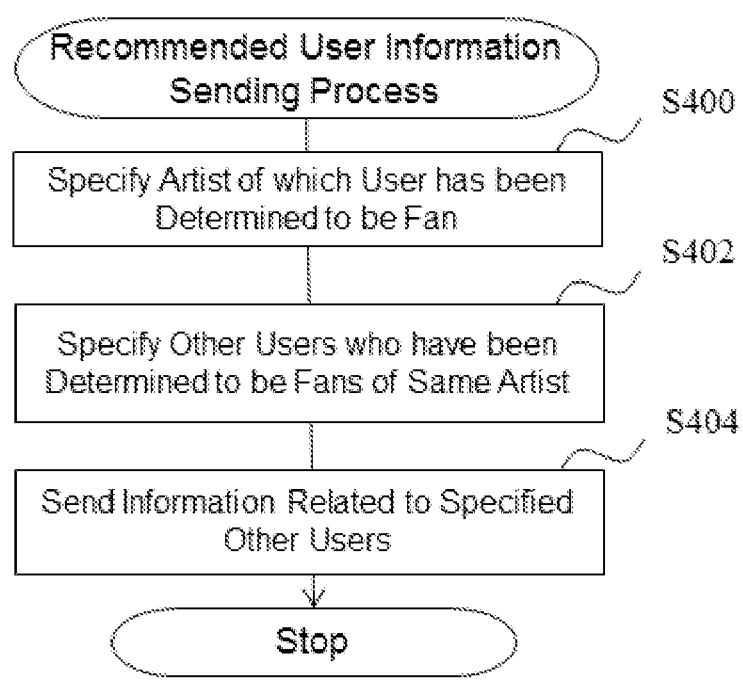
FIG. 19 is a flow diagram showing an example of a recommended user information sending process according to an embodiment.

The above is a description on the operations of sending posting information to terminal 30. Next, the operations of recommending other users to a user will now be described. FIG. 19 is a flow diagram showing an example of a recommended user information sending process performed by the system 10. The recommended user information sending process may be performed when a display request for a screen containing recommended user information is received from a terminal 30. As shown, the first step of the recommended user information sending process may be to specify an artist of which the user operating the terminal 30 has been determined to be a fan (step S400). More specifically, the system 10 may specify the "artist ID" that is stored in combination with the "user ID" of the user operating the terminal 30 in the fan management table 52*b*.

Subsequently, the system 10 may specify other users who have been determined to be fans of the same artist as the user operating the terminal 30 (step S402). More specifically, the system 10 may specify the "user IDs" that are stored, in the fan management table 52*b*, in combination with the "artist ID" of the artist of which the user operating the terminal 30 has been determined to be a fan.

Figure 20:
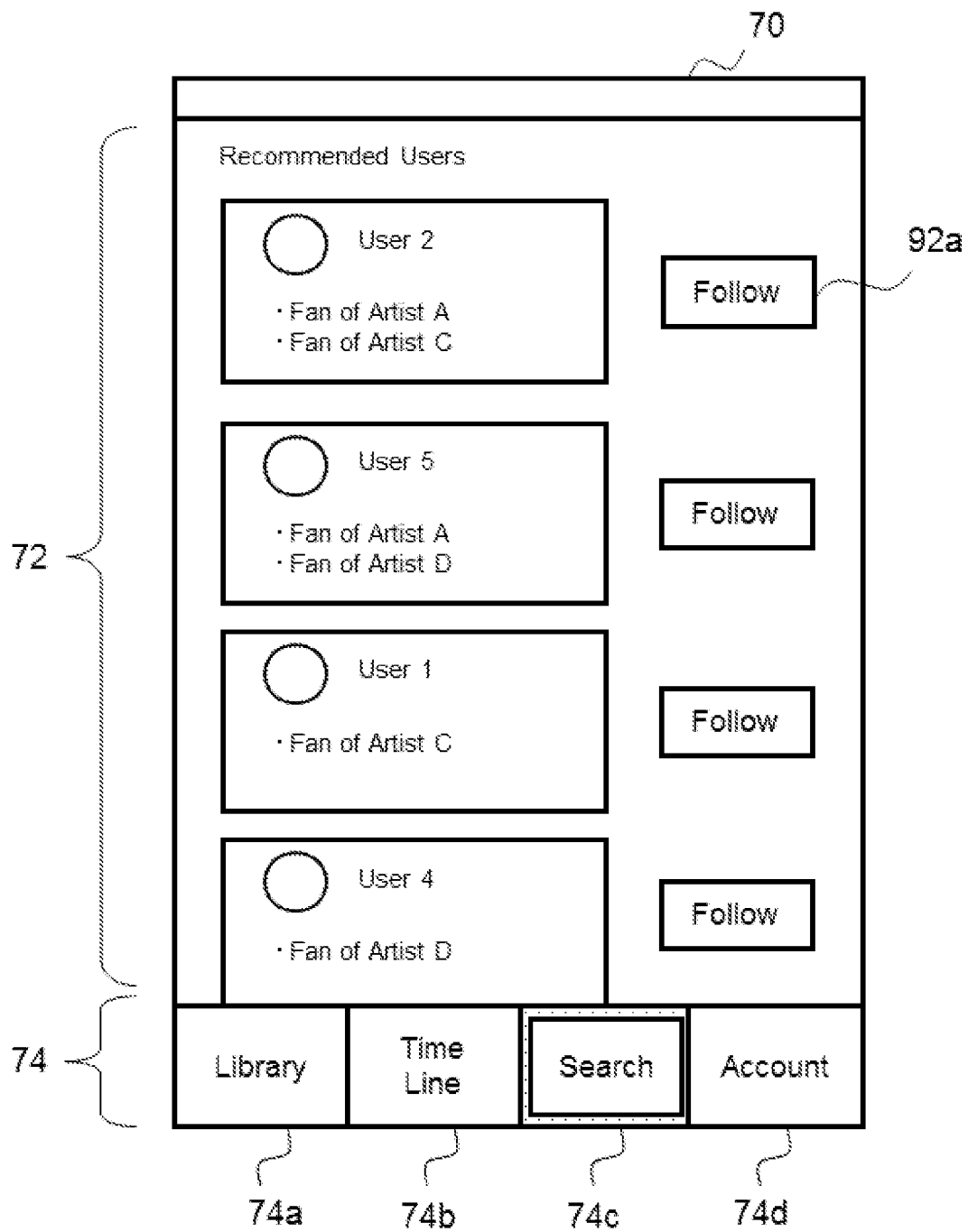
FIG. 20 is a diagram showing a display mode of the main screen according to an embodiment.

Further, the system 10 may generate screen data of a screen including information related to the specified other users and send the screen data to the terminal 30 (step S404); and the system 10 may end the recommended user information sending process. FIG. 20 is a diagram showing a display mode of the main screen 70 as an example of a screen containing the recommended user information displayed on the terminal 30. In the main screen 70 shown in the example, Search button 74*c* in the display switch instruction section 74 is selected; and the main display section 72 displays recommended user information in a list. This recommended user information is the above recommended user information extracted in the recommended user information sending process and sent to the terminal 30. In an embodiment, the recommended users may be sorted in the descending order of the number of artists of which both the user operating the terminal 30 and the recommended user have been determined to be fans (i.e., in the descending order of the number of artists of which both are fans). As shown, the information related to the recommended users displayed in the main screen 70 may include an image and a name specifying the recommended user in the upper portion, and information related to artists of which both the user operating the terminal 30 and the recommended user have been determined to be fans in the lower portion. As shown, a follow button 92*a* may be displayed on the right of each recommended user information; when the user operating the terminal 30 selects the follow button 92*a*, the user can follow the corresponding recommended user. More specifically, the follow information management table 52*e* may be updated such that the corresponding recommended user becomes a follow user of the user operating the terminal 30. It may also be possible that, after specifying other users who have been determined to be fans of the same artist as the user operating the terminal 30 in step S402 of the recommended user information sending process, the system 10 should narrow down the specified other users to the users who are fans of a predetermined number (e.g., five) or more of artists of which the user has been determined to be a fan, thereby to specify recommended users. Alternatively, the recommended users may be other users who have been determined to be fans of all the artists of which the user operating the terminal 30 has been determined to be a fan. Thus, in the system 10 according to an embodiment, other users who have been determined to be fans of the same artists as the user may be determined to be recommended users; and information on the determined recommended users may be sent to the terminal 30 operated by the user. Accordingly, the information sent to the terminal 30 may be in accordance with the preferences of the user in musical pieces.

The system 10 according to the embodiment described above may receive posting from the user, wherein the system 10 may send to the terminal 30 reproduction history information (use history information) corresponding to the user, and receive from the terminal the posting information including the "musical piece ID" (content specifying information) of the musical piece selected by the user among the musical pieces (digital contents) included in the reproduction history (use history) of the reproduction history information. Accordingly, the user has only to select a desired musical piece from the reproduction history to make posting related to the musical pieces including musical pieces reproduced previously. Further, since the posting information sent to the user may include posting related to musical pieces by a follow user, there is a chance of viewing the posting related to musical pieces of one's own interest. Further, when posting information is sent to the user, the screen data of the screen (posting information display screen) including a musical piece reproduction requesting area PA (content use requesting area) for requesting the reproduction of the musical piece related to the posting may be sent and, when the user selects a playback button in the musical piece reproduction requesting area PA, the screen data of the musical piece reproduction screen 80 (content use screen) for reproducing the musical piece corresponding to the musical piece may be sent. Therefore, the user can readily reproduce the musical piece related to the posting by the follow user, etc.

Further, the system 10 according to an embodiment may manage the "musical ID" in the posting information management table 52*d* and, in sending the posting information to the terminal 30, the system 10 may fetch musical piece information of the musical piece specified by the "musical piece ID" from the musical piece management table 52*c* and attach the fetched musical piece information to the posting information. As described above, the content information specifying a musical pieces (digital content) may be information other than "musical piece ID." One such example may be a combination of a "musical piece name" and an "artist ID."

The above description for the embodiment was focused on services for providing musical pieces as an example of digital contents; and the processes and procedures described herein may be applied to systems for providing various digital contents including videos, electronic books, and games. In application to services for providing digital contents other than musical pieces, a table corresponding to the musical piece management table 52*c* should manage information such as an ID identifying digital contents, a creator and a performer of the digital contents, an image file related to the digital contents, release date and time of the digital contents, data of the digital contents, an URL of a content use screen of the digital contents. Such content information related to the digital contents are not particularly limited and may naturally include other information.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A system connected via a communication network to a plurality of terminals operated by a plurality of users, the plurality of terminals including a first terminal operated by a first user and a second terminal operated by a second user, the system being capable of providing a set of one or more digital contents to the first user, the system comprising:

an information storage device configured to store at least first use history information indicating a history of reproducing the set of the one or more digital contents on the first terminal by the first user and to store at least second use history information indicating a history of reproducing the set of the one or more digital contents on the second terminal by the second user; and one or more processors capable of executing a particular program, wherein the particular program comprises:

a use history information sending module configured to send, in response to a request from the first terminal, the first use history information to the first terminal;

a posting information reception module configured to receive, from the first terminal, posting information that includes content specifying information specifying one or more selected digital contents, the one or more selected digital contents being selected by the first user from the set of the one or more digital contents reproduced by the first user on the first terminal as indicated by the first use history information;

a posting information registration module configured to store the received posting information in the information storage device; and a posting information sending module configured to send, in response to a request from the second terminal, the posting information stored in the information storage device to the second terminal for presentation to the second user, wherein the second user is determined to be a fan of an artist for the one or more selected digital contents by virtue of the second user has reproduced digital contents of the artist for more than a predetermined number of times.

2. The system of claim 1 wherein
the information storage device is further configured to store content information related to the set of the one or more the digital contents; and the posting information sending module is configured such that the sending of the posting information includes inserting, into the posting information, the content information on the one or more selected digital contents specified by the content specifying information included in the posting information before the posting information is sent to the second terminal.

3. The system of claim 1 wherein
the posting information sending module is further configured to send, to the second terminal, screen data of a posting information display screen including a content use requesting area for the second user operating the second terminal to make a use request for the one or more selected digital contents specified by the content specifying information included in the posting information; and the particular program further comprises a use screen sending module configured to send, in response to a use request for the one or more selected digital contents from the second terminal, screen data of a content use screen for using the one or more selected digital contents to the second terminal.

4. The system of claim 3 wherein
the information storage device is further configured to store content information related to the set of the one or more digital contents; and the use screen sending module is configured to send, to the second terminal, screen data of the content use screen including the content information on the one or more selected digital contents related to the use request.

5. The system of claim 1 wherein
the information storage device is further configured to store related user information specifying one or more other users in a particular relationship with the user;

the posting information registration module is configured to store, in association with the first user operating the first terminal having sent the posting information, the posting information in the information storage device; and the posting information sending module is configured to send, in response to a request from the first terminal, to the first terminal, the posting information associated with the first user operating the first terminal and the other users in the particular relationship with the first user.

6. The system of claim 1 wherein the set of the one or more digital contents includes at least one of musical pieces, videos, electronic books, and games.

7. A system connected via a communication network to a plurality of terminals operated by a plurality of users, the plurality of terminals including a first terminal operated by a first user and a second terminal operated by a second user, the system being capable of providing a set of one or more digital contents to the first user, the system comprising:

an information storage unit configured to store at least first use history information indicating a history of reproducing the set of the one or more digital contents on the first terminal by the first user and to store at least second use history information indicating a history of reproducing the set of the one or more digital contents on the second terminal by the second user;

a use history information sending unit configured to send, in response to a request from the first terminal, the first use history information to the first terminal;

a posting information reception unit configured to receive, from the first terminal, posting information that includes content specifying information specifying one or more selected digital contents, the one or more selected digital contents being selected by the first user from the set of the one or more digital contents reproduced by the first user on the first terminal as indicated by the first use history information;

a posting information registration unit configured to store the received posting information in the information storage device; and a posting information sending unit configured to send, in response to a request from the second terminal, the posting information stored in the information storage device to the second terminal for presentation to the second user, wherein the second user is determined to be a fan of an artist for the one or more selected digital contents by virtue of the second user has reproduced digital contents of the artist for more than a predetermined number of times.

8. A method for providing a set of one or more digital contents to a plurality of users by using a system connected via a communication network to a plurality of terminals operated by a plurality of users, the plurality of terminals including a first terminal operated by a first user and a second terminal operated by a second user, the system having an information storage device configured to store information, the method comprising:

storing, in the information storage device, at least first use history information indicating a history of reproducing the set of the one or more digital contents on the first terminal by the first user;

storing, in the information storage device, at least second use history information indicating a history of reproducing the set of the one or more digital contents on the second terminal by the second user sending, in response to a request from the first terminal, the first use history information to the first terminal;

receiving, from the first terminal, posting information that includes content specifying information specifying one or more selected digital contents, the one or more selected digital contents being selected by the first user from the set of one or more digital contents reproduced by the first user on the first terminal as indicated by the first use history information;

storing the received posting information in the information storage device; and sending, in response to a request from the second terminal, the posting information stored in the information storage device to the second terminal for presentation to the second user, wherein the second user is determined to be a fan of an artist for the one or more selected digital contents by virtue of the second user has reproduced digital contents of the artist for more than a predetermined number of times.

\* \* \* \* \*